United States Patent [19]
Markovitz et al.

[11] Patent Number: 5,623,174
[45] Date of Patent: Apr. 22, 1997

[54] INTERNAL GRADING OF GENERATOR STATOR BARS WITH ELECTRICALLY CONDUCTING THERMOPLASTIC PAINTS

[75] Inventors: Mark Markovitz, Schenectady; James J. Grant, Niskayuna; William E. Tomak, Scotia, all of N.Y.

[73] Assignee: General Electric Co., Schenectady, N.Y.

[21] Appl. No.: 569,629

[22] Filed: Dec. 8, 1995

[51] Int. Cl.$^6$ .......................... H02K 15/02; H02K 15/12; H01B 1/24
[52] U.S. Cl. .......................... 310/45; 310/354; 252/510; 252/511; 427/104; 428/364; 428/375; 428/924
[58] Field of Search .......................... 252/510, 511; 427/104; 310/45, 254; 428/364, 375, 924

[56] References Cited

U.S. PATENT DOCUMENTS

| | | | |
|---|---|---|---|
| 3,824,683 | 7/1974 | Rhudy | 310/45 |
| 4,001,616 | 1/1977 | Lonseth et al. | 310/45 |
| 4,470,898 | 9/1984 | Penneck et al. | 252/511 |
| 5,030,870 | 7/1991 | Wichmann | 310/45 |

*Primary Examiner*—Paul Lieberman
*Assistant Examiner*—M. Kopec
*Attorney, Agent, or Firm*—Nixon & Vanderhye

[57] ABSTRACT

High voltage generator stator bar for electrical generators internally graded with a fast drying, electrically conductive, carbon-filled thermoplastic paint composition exhibit improved electrical dissipation factor tip-up values.

8 Claims, 1 Drawing Sheet

INTERNAL GRADING OF GENERATOR STATOR BARS WITH ELECTRICALLY CONDUCTING THERMOPLASTIC PAINTS

TECHNICAL FIELD

This invention relates to the internal grading (i.e., the step-wise change from conductor to insulator) of high voltage stator bars for electrical generators so as to consistently obtain low dissipation factor tip-up values. In preferred forms, the present invention is embodied in insulated stator bars of dynamoelectric machines where an electrically conductive paint having a thermoplastic binder is first applied on the top and bottom edges and around the corners of the bare bar before application of the groundwall insulation.

BACKGROUND

Low dissipation factor tip-up values are desirable properties for insulated stator bars used in dynamoelectric machines, such as electrical power generators. Low dissipation factor tip-up values are desirable since they are indicative of a relatively small difference in dissipation factor at different electrical stresses and thereby provide an indirect measure of insulation efficacy.

Dissipation factor in generator stator bars is measured at different electrical stresses, for example, at 10, 20, 40, 60, 80 and 100 volts per mil (VPM). In this specification, the expression tip-up means the difference in percent dissipation factor measured at 10 and 100 VPM. Thus, tip-up with a stress factor of 10 will be greater than a tip-up value determined at a smaller VPM difference, for example, at 10–20 or 20–80 VPM where the stress factors are 2 and 4, respectively.

Market demands for low tip-up values in insulated stator bars have resulted in the use of low resistance paints, usually based on carbon-filled thermosetting epoxy binders, to coat the top and bottom edges of bare stator bars before the mica-based groundwall insulation is applied. While conductive paints reduce the tip-ups, the results have not been consistent and, in many cases, the use of thermosetting epoxy paints has not resulted in sufficiently low tip-up values.

Another disadvantage of thermosetting epoxy paints has been their slow curing properties or heat curing requirements. Epoxy paints are based on 1-part or 2-part systems. One-part paints contain the epoxy and hardener components, but a heat cure is usually required to obtain optimum performance. Two-part paints contain the epoxy resin component (Part 1) and the hardener (Part 2) which are mixed just prior to use. Although the hardeners in 2-part paints usually have a high reactivity and no heating is required to cure the paint, 8 to 16 hours at room temperature are usually required for optimum performance. Therefore, thermosetting epoxy paints used for internal grading require either baking at elevated temperatures or long drying times at room temperature before application of the groundwall insulation.

The objects of the present invention are to obtain consistently low tip-up values in insulated stator bars without the necessity of baking to adequately cure the paint or to provide a paint composition that adequately cures in a short amount of time, for example, 30 minutes or less, at room temperature.

SUMMARY OF THE INVENTION

Figure 1:
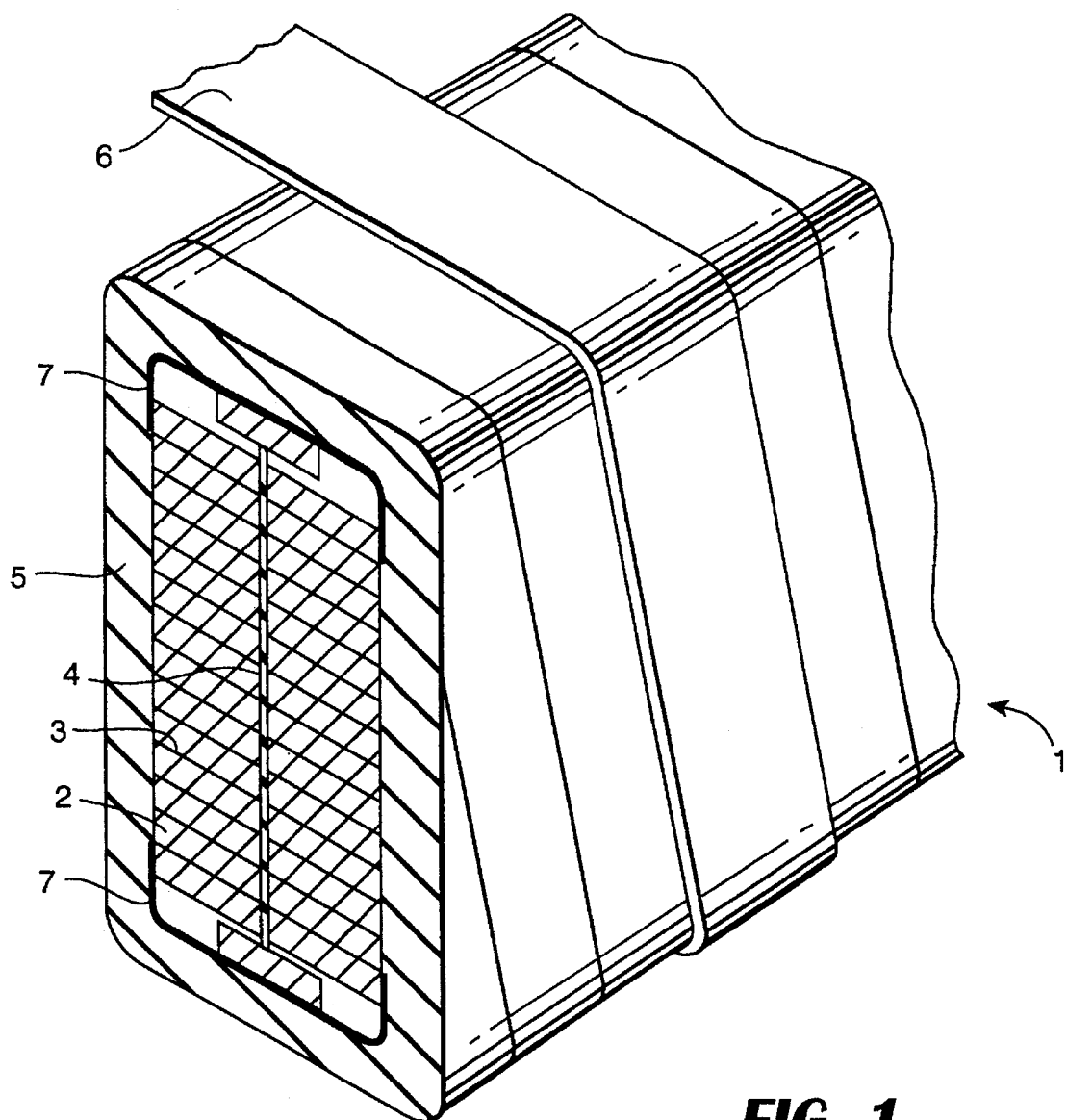
FIGURE 1 is an end elevational view of a stator bar according to the invention.

High voltage stator bars are internally graded to consistently obtain low dissipation factor tip-up values by painting the bare bars with a low resistance paint made from a thermoplastic binder dissolved in solvent with carbon particles dispersed in the solution.

FIGURE 1 is an end elevational view of a stator bar which embodies the present invention. Referring to FIGURE 1, a stator bar 1 for a generator is represented that illustrates some of the general concepts of this invention as well as a suitable application for the electrically conductive thermoplastic paints of this invention.

As shown, the stator bar 1 is composed of a number of conducting copper strands 2 that are insulated from each other by strand insulation 3, as is conventional in the art. In addition, the conductor strands 2 are arranged to form two arrays that are separated by a strand tier separator 4. Surrounding both arrays is a groundwall insulation 5 formed by multiple wrappings of a mica paper tape 6. Interposed between the stator bar strands 2 and the groundwall insulation 5 on the top and bottom edges and around the corners of the bare bar is a coating of the electrically conductive thermoplastic paint 7 according to this invention. The conductive paint 7 therefore provides internal grading between the stator bar conductors 2 and the ground insulation 5. While the electrically conductive paint 7 is shown on the top and bottom edges and around the corners of the bare bar, an alternative method is to coat the entire bare bar so that all surfaces, including the sides, are coated.

The paint compositions used in the present invention are based upon thermoplastic resin binders and binder systems. Of the many choices available, linear copolymers of bisphenol A and epichlorohydrin are preferred, although the invention is not so limited. These preferred copolymers are most preferably used with methyl ethyl ketone, glycol ethers, or a glycol ether ester as a solvent. The preferred copolymers of epichlorohydrin and bisphenol A will generally have a weight average molecular weight of greater than 15,000 (more preferably between 40,000 and 200,000), a hydroxyl content of less than about 0.40 eq./100 grams, and an epoxide content of less than about 0.025 eq./100 grams. Such preferred linear copolymers of epichlorohydrin and bisphenol A are available commercially from a number of sources, for example, the EPOTUF 38-525 resin from Reichhold Chemical, Inc., the EPONOL Resins 53 and 55 from Shell Chemical Co., and the GZ-488 resins from Ciba Geigy Co.

In place of a linear copolymer of epichlorohydrin and bisphenol A, other thermoplastic polymeric materials can be used such as polyimides, acrylonitrile-butadiene-styrene, Neoprene, polyamide-imides, polybutylene terephthalate, polycarbonates, polydimethylsiloxanes, polyetherketones, polyetherimides, polyethersulfones, polyethylenes, polyethylene terephthalate, polymethyl methacrylate, polypropylenes, polystyrene, polyethers, polysulfones, and polyurethanes.

It is believed that the thermoplastic binder is more effective for internal grading than a thermosetting binder because the inherent greater elongation of thermoplastic binders allows electrical contact to be maintained despite the differences in the thermal expansion coefficients of the various components that make up an insulated stator bar.

Conveniently, the thermoplastic binder is used as a solution in an organic solvent; however, aqueous carriers are also contemplated in water-borne thermoplastic resin binder systems.

A second essential component of the paint composition is a low resistance electroconductive filler. Carbon black Vulcan XC-72R (Cabot Corp.) was used in the electrically conductive thermoplastic paints in the examples of this invention. Other carbon blacks can be used, for example, Vulcan XC-72, Vulcan SC, Vulcan P, Vulcan C and BLACK PEARLS 2000 (Cabot Corp.); CONDUCTEX SC, BATTERY BLACK, PEERLESS ARK II and EXCELSIOR (Columbian Carbon Co.); KETJENBLACK EC (Armak Co.); PRINTEX XE 2, PRINTEX L 6, PRINTEX L, and PRINTEX 3 (Degussa Co.). In place of carbon black, graphite powders such as HPN-2, #200-39, #057 and MICROFYNE-TRIPLE VALVE (Dixon Ticonderoga Co.) and other natural or synthetic graphite powders available from UCAR Carbon Co., Lonza Inc., Superior Graphite Co., Asbury Graphite Mills and other suppliers can be used.

The electrically conductive thermoplastic paints used for internal grading which resulted in low tip-up values have a resistance of less than 5,000,000 ohms/square, preferably less than 250,000 ohms/square. Alternatively, the resistance may fall in the range of 2,500 to less than 5,000,000 ohms/square and preferably 50,000 to less than 500,000 ohms/square. The resistance range can be controlled by changing the carbon content of the paint.

DETAILED DESCRIPTION OF THE INVENTION

The following examples and comparative examples serve to illustrate the present invention. Unless otherwise stated, all parts and percentages are by weight and temperatures are in centigrade.

Twenty-five bars were made which demonstrate conventional products and to compare with the excellent tip-up results obtained with the internal grading system that is the subject of this invention. The bars used in the examples used insulation system "A" that is based on mica paper, woven glass tape backer for taping strength, non-woven polyester mat backer and an epoxy binder. An additional two bars made with another insulation system ("B") demonstrate the widespread usefulness of this invention.

Percent dissipation factor at 10 and 100 VPM were measured on these bars. Some of the bars were tested at two locations to obtain two sets of readings; the two sets of readings obtained with two separate electrodes are designated A and B, following the bar number, in the tables.

Examples 1–5 shows the 10 to 100 VPM tip-up results of 25 bars insulated with the same insulation system and build. Seven bars containing no internal grading are listed in Example 1, internal grading with thermosetting epoxy conductive paints which represent conventional internal grading paints are in Example 2, and internal grading with electrically conductive thermoplastic paints which represent this invention are in Examples 3–5. Example 6 shows a similar improvement in 10 to 100 VPM tip-up results when a thermoplastic paint of this invention was used for internally grading another insulation system "B." Tape system "B" has a similar construction as that of "A," but the binder composition is different.

EXAMPLE 1 (COMPARATIVE)

Seven bars were insulated with mica paper tape system "A" that uses an epoxy binder. No internal grading was used for these bars. The percent dissipation factor and tip-up results are summarized in Table 1 showing a mean tip-up value of 1.055, range 0.706 to 1.466.

TABLE 1

| Bar No. | % Dissipation Factor @ 25 C. (60 Hertz | | Tip-Up % |
|---|---|---|---|
| | 10 VPM | 100 VPM | |
| 1A | 0.419 | 1.364 | 0.945 |
| 1B | 0.490 | 1.470 | 0.980 |
| 2A | 0.464 | 1.280 | 0.816 |
| 2B | 0.454 | 1.920 | 1.466 |
| 3 | 0.477 | 1.625 | 1.148 |
| 4A | 0.433 | 1.422 | 0.989 |
| 4B | 0.444 | 1.510 | 1.066 |
| 5 | 0.441 | 1.690 | 1.249 |
| 6A | 0.474 | 1.446 | 0.972 |
| 6B | 0.468 | 1.740 | 1.272 |
| 7 | 0.344 | 1.050 | 0.706 |

EXAMPLE 2 (COMPARATIVE)

Thirteen 13.8 KV build bars were insulated with mica tape system "A" and 7 different conductive paints were used for internal grading. The paints differed in the thermosetting epoxy binders and carbon content used as conductive filler. The bars in Example 2 are identical to those in Example 1 except for the internal grading paints that were used in Example 2. Specifically, the conductive paints which were used in Example 2 are as follows:

| Bar No(s). | Conductive Paint Composition (Percentages based on Solids Weight) |
|---|---|
| 8–10 & 12 | epoxy paint which contained 9.07% accelerator, 47.5% graphite (Dixon-Ticonderoga #057), with solids content of 60.0% in methyl ethyl ketone |
| 11 & 13 | epoxy paint (epoxy novolac and a liquid bisphenol A-diglycidyl ether epoxy resin in a 70:30 ratio) which contained 6.96% accelerator, and 47.5% graphite (Dixon-Ticonderoga #057) with solids content of 60.0% in methyl ethyl ketone |
| 14 | epoxy paint (epoxy novolac and a liquid bisphenol A-diglycidyl ether epoxy resin in a 50:50 ratio) which contained 6.96% accelerator, and 47.5% graphite (Dixon-Ticonderoga #057) with solids content of 60.0% in methyl ethyl ketone |
| 15 | epoxy paint (epoxy novolac and a liquid bisphenol A-diglycidyl ether epoxy resin in a 50:50 ratio) which contained 18.0% carbon (Cabot Corp. XC-72R) with solids content of 50.0% in solvent blend of toluene, xylene and 2-propanol |
| 16 | epoxy paint (epoxy novolac and a liquid bisphenol A-diglycidyl ether epoxy resin in a 70:30 ratio) which contained 18.0% carbon (Cabot Corp. XC072R) with solids content of 55.0% in solvent blend of xylene and methyl ethyl ketone |
| 17 & 18 | epoxy paint (epoxy novolac and 2-ethyl-4-methyl imidazole curing agent in a 100.0:3.0 weight ratio) which contained 18.0% carbon (Cabot Corp. XC-72R) with solids content of 55.0% in solvent blend of xylene and methyl ethyl ketone |
| 19 & 20 | epoxy paint (epoxy novolac and 2-ethyl-4-methyl imidazole curing agent in a 100.0:6.0 weight ratio) which contained 18.0% carbon (Cabot Corp. XC-72R) with solids content of 55.0% in solvent blend of xylene and methyl ethyl ketone |

The epoxy paints used in Example 2 required a heat cure or 8–16 hours at room temperature to gel. While the paints caused the mean tip-up to decrease from 1.055 to 0.741, range 0.280 to 1.243, the tip-up values were still high.

TABLE 2

| Bar No. | % Dissipation Factor @ 25 C. (60 Hertz) | | Tip-Up |
|---|---|---|---|
| | 10 VPM | 100 VPM | % |
| 8A | 0.727 | 1.593 | 0.866 |
| 8B | 0.865 | 1.420 | 0.555 |
| 9A | 0.862 | 1.420 | 0.558 |
| 9B | 0.977 | 2.220 | 1.243 |
| 10 | 0.860 | 1.700 | 0.840 |
| 11 | 0.964 | 1.677 | 0.713 |
| 12A | 1.110 | 1.380 | 0.280 |
| 12B | 0.535 | 1.563 | 1.028 |
| 13A | 0.624 | 1.303 | 0.679 |
| 13B | 0.673 | 1.208 | 0.535 |
| 14A | 0.617 | 1.230 | 0.613 |
| 14B | 0.838 | 1.542 | 0.704 |
| 15A | 0.395 | 1.036 | 0.641 |
| 15B | 0.397 | 1.005 | 0.608 |
| 16A | 0.398 | 1.195 | 0.797 |
| 16B | 0.406 | 1.099 | 0.693 |
| 17A | 0.687 | 1.400 | 0.713 |
| 17B | 0.448 | 1.277 | 0.829 |
| 18A | 0.670 | 1.560 | 0.890 |
| 18B | 0.484 | 1.353 | 0.869 |
| 19A | 0.497 | 1.331 | 0.834 |
| 19B | 0.716 | 1.357 | 0.641 |
| 20A | 0.397 | 1.261 | 0.864 |
| 20B | 0.475 | 1.267 | 0.792 |

EXAMPLE 3 (INVENTION)

A thermoplastic paint containing 15.0% carbon XC-72R (based on solids) and 25.0% solids was made by dissolving 53.13 parts-by-weight (pbw) of Ciba's GZ 488-N40 in 43.13 pbw of methyl ethyl ketone (MEK) and then dispersing 3.74 pbw of Vulcan XC-72R carbon black with high shear mixing. Ciba's GZ 488-N40 is a 40% solids in MEK solution of a high molecular weight linear copolymer of epichlorohydrin and bisphenol A having a minimum epoxide equivalent weight of 3,570, and a Gardner-Holdt viscosity of U-Y. The groundwall insulation was applied after allowing the paint to dry 15–30 minutes at room temperature. The surface resistance of the paint was 60,000 to 190,000 ohms/square.

Bar No. 21 which used this paint for internal grading had tip-up values of 0.237 and 0.174.

| Bar No. | % Dissipation Factor @ 25 C. (60 Hertz) | | Tip-Up |
|---|---|---|---|
| | 10 VPM | 100 VPM | % |
| 21A | 0.353 | 0.590 | 0.237 |
| 21B | 0.366 | 0.540 | 0.174 |

EXAMPLE 4 (INVENTION)

A thermoplastic paint containing 15.0% carbon XC-72R (based on solids) and 35.0% solids was made by dissolving 74.38 pbw of Ciba's GZ 488-N40 in 20.37 pbw of MEK and then dispersing 5.25 pbw of Vulcan XC-72R carbon black with high shear mixing. Groundwall insulation was applied after allowing the paint to dry 15–30 minutes at room temperature. The surface resistance of the paint film was 140,000 to 240,000 ohms/square.

Bars Nos. 22 and 23 internally graded with this paint had low tip-up values.

| Bar No. | % Dissipation Factor @ 25 C. (60 Hertz) | | Tip-Up |
|---|---|---|---|
| | 10 VPM | 100 VPM | % |
| 22A | 0.359 | 0.565 | 0.206 |
| 22B | 0.348 | 0.540 | 0.192 |
| 23 | 0.309 | 0.410 | 0.101 |

EXAMPLE 5 (INVENTION)

A thermoplastic paint containing 15.0% carbon black XC-72R (based on solids) and 35.0% solids was made by dissolving 74.31 pbw of Reichhold's Epotuf 38-525 in 20.37 pbw of MEK and then dispersing 5.25 pbw of carbon black Vulcan XC-72R with high shear mixing. Reichhold's Epotuf 38-525 is a 40% solids in MEK solution of a high molecular weight linear copolymer of epichlorohydrin and bisphenol A having a minimum epoxide equivalent weight of 4,000 and a Gardner-Holdt viscosity of V-Y. The paint was allowed to dry 15–30 minutes at room temperature before application of the groundwall insulation. The surface resistance of the paint film was 50,000 to 500,000 ohms/square.

Bars Nos. 24 and 25 internally graded with this paint had low tip-ups.

| Bar No. | % Dissipation Factor @ 25 C. (60 Hertz) | | Tip-Up |
|---|---|---|---|
| | 10 VPM | 100 VPM | % |
| 24A | 0.364 | 0.485 | 0.121 |
| 24B | 0.383 | 0.483 | 0.100 |
| 25A | 0.375 | 0.545 | 0.170 |
| 25B | 0.378 | 0.535 | 0.157 |

EXAMPLE 6 (COMPARATIVE AND INVENTION)

Bar No. 26 was insulated with tape system "B." No internal grading was used.

Bar No. 27 was identical to Bar No. 26 except that the bar was internally graded with the same paint that was used in Example 5. The paint was allowed to dry 15–30 minutes at room temperature before applying tape "B."

The % tip-up decreased from 0.598 to 0.172 when the electrically conductive thermoplastic paint was used.

| Bar No. | % Dissipation Factor @ 25 C. (60 Hertz) | | Tip-Up |
|---|---|---|---|
| | 10 VPM | 100 VPM | % |
| 26 | 0.402 | 1.000 | 0.598 |
| 27 | 0.371 | 0.543 | 0.172 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of reducing the dissipation factor tip-up in electrical generator stator bars comprising applying between at least a portion of the conductive core of said stator bar and the surrounding insulating layer of said stator bar an electrically conductive paint composition composed of a thermoplastic resin binder and a carbon filler selected from the group consisting of graphite, carbon black, and mixtures thereof.

2. The method of claim 1 in which the paint composition has a resistance in the range of about 2,500 to less than 5,000,000 ohms/square.

3. The method of claim 2 in which the paint composition has a resistance in the range of about 25,000 to about 500,000 ohms/square.

4. The method of claim 1 in which the electrically conductive paint is applied to a bare stator bar on the top and bottom edges.

5. The method of claim 1 in which the thermoplastic resin binder is a linear copolymer of bisphenol A and epichlorohydrin.

6. An electrical generator stator bar coated with an electrically conductive thermoplastic paint composition, the coating having a resistance in the range of about 2,500 to less than 5,000,000 ohms/square wherein said electrically conductive thermoplastic paint is coated between at least a portion of the conductive core of said stator bar and the surrounding insulating layer of said stator bar, and wherein said electrically conductive thermoplastic paint composition comprises a thermoplastic resin binder and carbon filler selected from the group consisting of graphite, carbon black, and mixtures thereof.

7. The electrical generator stator bar of claim 6 in which the coating has a resistance in the range of about 25,000 to about 500,000 ohms/square.

8. The electrical generator stator bar of claim 6 in which the thermoplastic resin binder is a linear copolymer of bisphenol A and epichlorohydrin.

* * * * *